3,388,394
THIN FILM RANGE GATED
FILTER CIRCUIT
William L. Cappadona, Commack, N.Y., assignor to the United States of America as represented by the Secretary of the Air Force
Filed Feb. 13, 1967, Ser. No. 616,442
1 Claim. (Cl. 343—7.7)

ABSTRACT OF THE DISCLOSURE

A microelectronic range gated filter circuit designed for a one to one translation to deposited thin film circuitry. One substrate forms the back side of a circuit module consisting of a boxcar, low-pass filter, full wave rectifier, integrator and output gate. The other substrate forming the top side of the module consists of high-pass filter and differential amplifier.

---

This invention relates generally to moving target indicator radar systems, and more specifically to a microelectronic range gated clutter filter subassembly for radar signal processing to provide a moving target indication.

Presently, most radar systems have made the transition from the vacuum tube to the transistor with all of its ensuing benefits. This invention concerns a further extension of the art by modifying a transistorized circuit in a novel and unusual way to produce a microminiaturized circuit, which is smaller and more reliable than any similar transistor or vacuum tube circuit known in the art.

By using thin-film and monolithic circuit techniques, it is possible to reduce the volume of a vacuum tube circuit as much as 4000 times and the same transistorized circuit 25 times. This, along with the corresponding reduction in weight, makes the circuit of this invention ideal for, but not limited to, airborne and space borne radar systems.

Concomitant improvements also accure in the form of increased reliability, for example, this circuit is at least 100 times more reliable than a vacuum tube circuit and 10 times more reliable than a transistor circuit.

The typical moving traget indicator (MTI) signal processor filter the clutter and moving target to provide an MTI video output that is switched with the normal video to obtain a gated video output. The MTI video output consists of MTI that is consistent with the maximum clutter extent; the remaining range extent of the radar is covered by a normal video input obtained from a conventional receiver. Hence, it is seen that the clutter filter is the heart of the MTI system.

The clutter filter may be either a real-time filter such as a delay-line canceler or a non real-time clutter filter such as the range-gated filter of this invention.

The output signals in a real-time filter appear at a video rate with a time relationship in respect to the input signals related directly to the velocity of propagation of the transmitted pulse.

The output in the non real-time clutter filter is an audio frequency signal, and a gating system is used to reinsert the time sequence and sense.

It is therefore, a primary object of this invention to provide a circuit that is readily adapted to microminiaturization.

It is another object of this invention to provide a new and improved range-gated filter circuit.

It is still another object of this invention to provide a new and improved range-gated filter circuit which may be used in a moving target indicator type radar system.

It is a further object of this invention to provide a novel and unusual microelectric range-gated filter circuit.

It is still another object of this invention to provide an improved range-gated filter circuit which replaces large bulky components with a new and unexpected combination of microminiaturized components which produce improved results.

It is still a further obpject of this invention to provide novel radar module which may be easily combined with a plurality of similar units to provide a moving target indication for a radar system.

It is still another object of this invention to provide a range-gated filter circuit which is economical to produce and utilizes conventional, currently available components that lend themselves to standard mass production manufacturing techniques.

These and other advantages, features and objects of the invention will become more apparent from the following description taken in connection with the illustrative embodiment in the accompanying drawings wherein.

Figure 1:
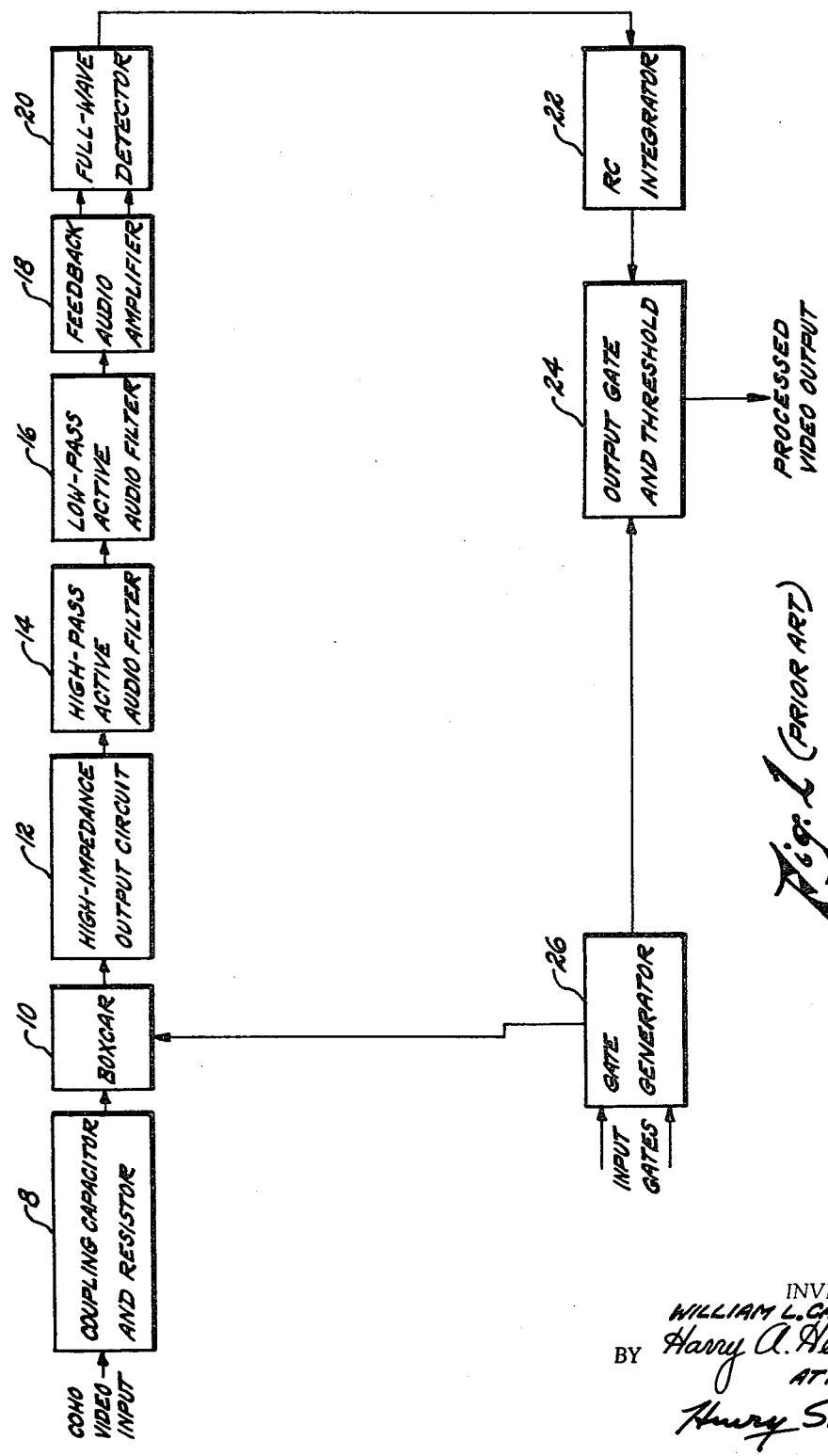
FIG. 1 is a block diagram of a prior art range-gated filter.

Referring now to the drawings, FIG. 1 shows a conventional transistorized circuit which receives a coherent video input at a coupling capacitor and resistor 8, the input is then applied to a boxcar 10 that is driven by the gate generator 26. The output of the boxcar is sent to a boot-strapped high-impedance emitter follower output circuit 12 and then to high-pass and low-pass audio filter 14 and 16, respectively, which together form a band-pass filter with the desired shape.

The output of the audio filter is then applied to a feedback audio amplifier to provide stable amplification. The feedback audio amplifier 18 has push-pull outputs which are fed to a full-wave detector 20. The output of the full-wave detector, which is moving target information, is integrated in an RC integrator 22 with a time constant set to correspond to the time during which the antenna beam of the radar traverses the target. The DC output from the RC integrator is gated out of the range-gate filter subassembly at 24 by the gate generator 26 which initially gates the video into the filter.

Figure 2:
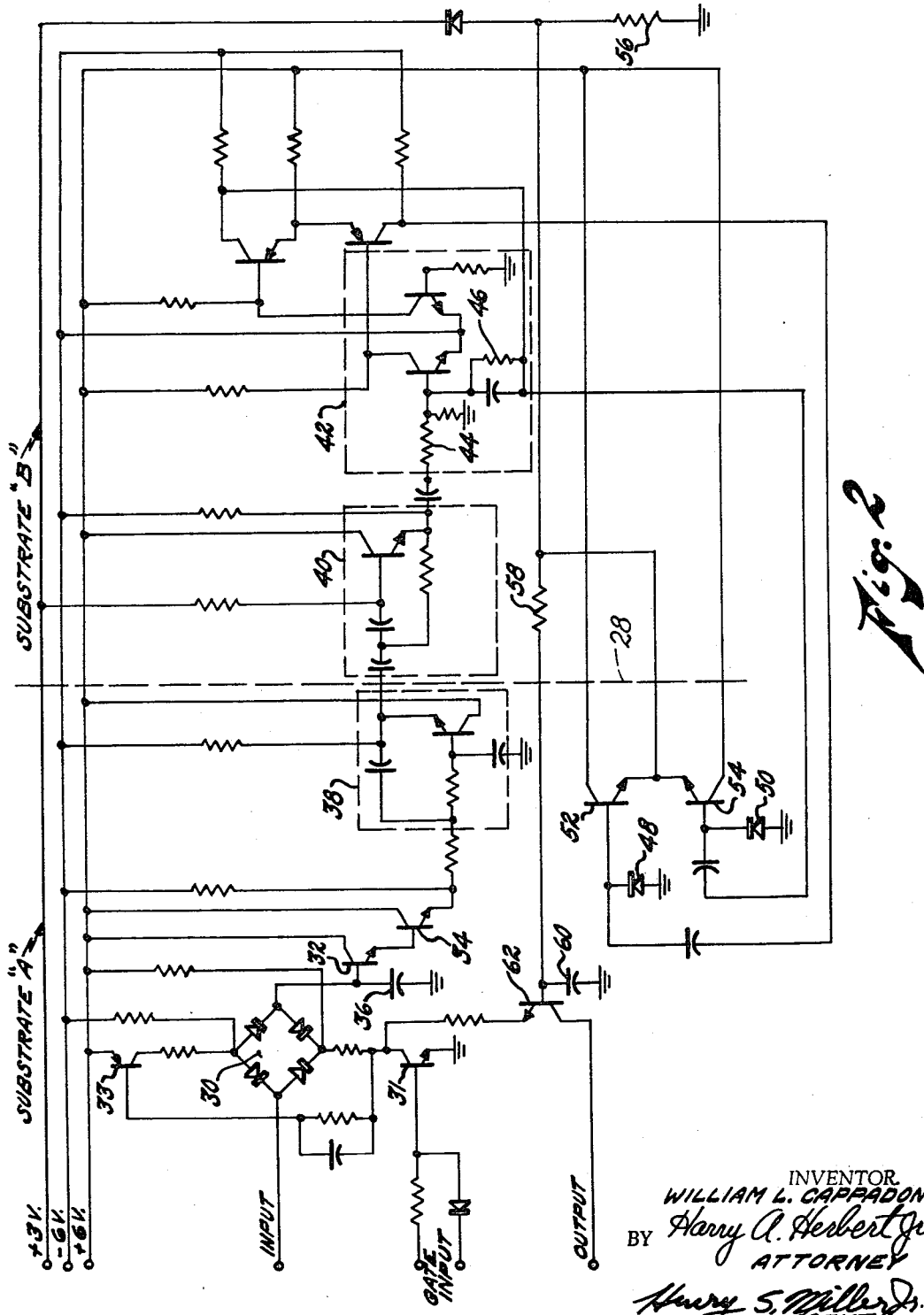
FIG. 2 is a schematic diagram of a circuit included by this invention.

FIG. 2 shows a schematic view of the microelectronic range-gated filter subassembly of this invention.

The range-gated filter circuit utilizes two substrates. The "A" substrate, forms the back side of the circuit module and consists of the boxcar, low-pass filter, full wave rectifier, integrator and output gate. The dashed line 28 represents the division of substrates A and B. The B substrate, forming the topside of the module, consists of the high-pass filter and differential amplifier. By using two substrates the manufacturing process is simplified and there is ease of deposition of resistors where there is a large spread of resistive values.

The coherent video input is sent directly to the boxcar 30. The input coupling capacitor and resistor to the boxcar shown in FIG. 1 is eliminated since the boxcar is being driven from a low impedance source; a DC level at the input will not affect performance since this will appear as clutter that is filtered by the high-pass filter. The signal from the boxcar is then sent to a high impedance Darlington pair 32 and 34. Transistor 32 provides sufficiently low leakage current so that no tilt is discernible at the charging capacitor 36. The signal is then fed to the low-pass filter 38 and high-pass filter 40. A differential feed-back amplifier 42 receives the signal from the band-pass filters. The current gain of this amplifier is stabilized at 100 times by feedback resistors 44 and 46. The differential amplifier is used to provide good DC stability with a monolithic integrated chip rather than by the use of large by-pass condensers. The output of the differential amplifier then enters the full wave detector comprising diodes 48 and 50. The push-pull outputs are then summed through transistors 52 and 54 which perform the function of summing diodes in the prior art, but provide a low output impedance for the RC integration network.

The discharge resistor 56 for the integrator is placed at the junction of the emitters for transistors 52 and 54. The charge resistor 58 follows this point; hence, capacitor 60 is charged through resistor 58 and discharged through resistors 58 and 56. The sensitivity of the circuit is increased over the prior art at this point since the original circuit is attenuated by the charge and discharge resistors, while this invention has no such loss. The output gate 62 uses the same gate signal as the input. The collector to emitter junction of transistor 31 performs the same function as the isolating resistor and clamping diode used in the transistor circuit.

Although the invention has been described with reference to a particular embodiment, it will be understood to those skilled in the art that the invention is capable of a variety of alternative embodiments within the spirit and scope of the appended claim.

I claim:

1. A microelectronic range-gated filter for radar signal processing comprising in combination: means for inserting a coherent video input pulse; a pulse lengthening means; gate means for allowing a pulse to enter directly into the pulse lengthening means of the filter; a high impedance means connected to said pulse-lengthening means to provide coupling for an input pulse; a high pass filter and low pass filter connected serially to said high impedance means to provide a band pass filter for a pulse; a differential amplifier means connected to the band pass filter for amplifying pulse; means connected to the amplifier for integrating the output of said amplifier; and a gate means connected to said integrating means for controlling a filtered output pulse.

References Cited
UNITED STATES PATENTS

| | | | |
|---|---|---|---|
| 2,663,806 | 12/1953 | Darlington | 307—88.5 |
| 2,776,426 | 1/1957 | Altman | 343—7.7 X |

RODNEY D. BENNETT, *Primary Examiner.*

C. L. WHITHAM, *Assistant Examiner.*